United States Patent [19]

Chang et al.

[11] Patent Number: 4,991,177
[45] Date of Patent: Feb. 5, 1991

[54] LASER BEAM CLEAN-UP USING MUTUALLY PUMPED PHASE CONJUGATION

[75] Inventors: Tallis Y. Chang, Woodland Hills; Pochi A. Yeh, Thousand Oaks, both of Calif.

[73] Assignee: Rockwell International Corporation, El Segundo, Calif.

[21] Appl. No.: 488,340

[22] Filed: Mar. 2, 1990

[51] Int. Cl.$^5$ .............................................. H01S 3/10
[52] U.S. Cl. ...................................... 372/21; 372/33; 350/354
[58] Field of Search .................... 372/21, 9, 98, 700, 372/33; 350/354, 353

[56] References Cited

U.S. PATENT DOCUMENTS

| | | | |
|---|---|---|---|
| 4,794,605 | 12/1988 | Aprahamian et al. | 372/21 |
| 4,902,980 | 2/1990 | O'Meara | 372/21 |
| 4,911,537 | 3/1990 | Ewbank | 350/354 |
| 4,921,335 | 5/1990 | Ditman, Jr. | 350/354 |

OTHER PUBLICATIONS

A. Chiou and P. Yeh, "Laser-beam cleanup using photorefractive two-wave mixing and optical phase conjugation," Optics Letters, vol. 11, No. 7, pp. 461–463, Jul. 1986.
J. Feinberg, "Photorefractive Nonlinear Optics," Physics Today, pp. 46–52, Oct. 1988.

*Primary Examiner*—Frank Gonzalez
*Assistant Examiner*—Susan S. Morse
*Attorney, Agent, or Firm*—John C. McFarren

[57] ABSTRACT

A mutually pumped phase conjugator (MPPC) is used to remove spatial distortions from a high power laser beam. The high power beam with its "dirty" spatial profile is directed into one side of the MPPC. A spatially clean beam at the same nominal frequency as the high power beam is output from a continuous wave (CW) laser and directed into the opposite side of the MPPC. As a result of mutually pumped phase conjugation, the MPPC returns a phase conjugate beam that retains the clean spatial profile of the CW beam but acquires the temporal characteristics of the high power beam. A Faraday isolation system may be used to separate the phase conjugate beam from the incident CW beam to provide an output beam having a clean spatial profile. If desired, the high power beam can be transformed into an image bearing output beam simply by modifying the incident CW beam with a transparency or spatial light modulator. If the average intensity of the dirty beam is much higher than that of the CW beam, only a small fraction of the dirty beam needs to be directed into the MPPC for beam clean-up. The larger fraction of the dirty beam can be directed into a photorefractive crystal for two-beam coupling with the clean beam output by the MPPC. By means of photorefractive two-beam coupling, energy from the dirty high power beam serves to amplify the clean beam, thereby improving the overall energy efficiency of the laser beam clean-up system.

17 Claims, 2 Drawing Sheets

LASER BEAM CLEAN-UP USING MUTUALLY PUMPED PHASE CONJUGATION

TECHNICAL FIELD

The present invention relates to laser beam systems and, in particular, to optical devices for removing spatial distortions from laser beams.

BACKGROUND OF THE INVENTION

In many laser beam systems, particularly those using high power lasers, the laser beams acquire poor spatial profiles because of distortions introduced as the beams are directed through chains of optical devices. In general, spatially distorted laser beams must be "cleaned" before they can be used effectively in linear or nonlinear optical systems. One prior method of laser beam clean-up uses a pinhole at a Fourier plane to filter out the high spatial frequency components. Such pinholes, which are approximately 10 microns in diameter for visible wavelengths of light, must be very thin, however, and therefore cannot withstand high power laser beams.

A desirable aspect of spatial filtering for laser beam clean-up is that a cleaned laser beam retains the same temporal characteristics as the distorted beam. A recent improvement of this filtering concept uses photorefractive two-beam coupling for better energy efficiency. However, current methods of laser beam clean-up using photorefractive two-beam coupling also require a pinhole. Thus, for removing spatial distortions from high power laser beams, there is a need for a method that is energy efficient, that retains the temporal characteristics of the distorted beam, and that is not subject to the damage and misalignment problems caused by pinhole filters.

SUMMARY OF THE INVENTION

The present invention provides a means for removing spatial distortions from a laser beam without the use of a pinhole filter. The invention uses a mutually pumped phase conjugator that may be combined with a two-beam coupling crystal for energy efficient laser beam clean-up. The system is useful for removing distortion from a high power laser beam to output a modified beam having a desired profile, such as a diffraction limited Gaussian beam. Furthermore, because of the nature of phase conjugation, the system is self-aligning in that it can accommodate an input beam having some alignment instability.

A high power pulsed laser, such as a doubled YAG laser, for example, typically generates a beam having a "dirty" spatial profile with "hot" spots. The dirty beam is directed into one side of a mutually pumped phase conjugator (MPPC), such as a BaTiO$_3$ photorefractive crystal, for example. A spatially clean beam, having a diffraction limited Gaussian profile, for example, is output from a continuous wave (CW) laser at the same nominal frequency as the pulsed laser. The clean CW beam is directed into the opposite side of the photorefractive crystal. As a result of mutually pumped phase conjugation, the MPPC returns a phase conjugate of the CW beam that retains the clean spatial profile of the CW beam but acquires the pulse characteristics of the pulsed beam. A Faraday isolation system may be used to separate the incident CW beam from the phase conjugate beam to output a pulsed beam having a clean spatial profile.

If the average intensity of the dirty pulsed beam is much higher than that of the CW beam, only a small fraction of the dirty pulsed beam needs to be directed into the MPPC for beam clean-up. The larger fraction of the dirty pulsed beam can be directed into a second photorefractive crystal for two-beam coupling with the clean (low intensity) phase conjugate beam output by the MPPC. By means of photorefractive two-beam coupling of beams having the same temporal characteristics, energy from the dirty pulsed beam serves to amplify the clean pulsed beam, thereby improving the energy efficiency of the laser beam clean-up system.

BRIEF DESCRIPTION OF THE DRAWINGS

For a more complete understanding of the present invention and for further advantages thereof, the following Description of the Preferred Embodiments makes reference to the accompanying Drawings, in which.

DESCRIPTION OF THE PREFERRED EMBODIMENTS

The system of the present invention utilizes the phenomenon of mutually pumped phase conjugation to remove spatial distortions from laser beams. The system also may include photorefractive two-beam coupling for better energy efficiency.

Mutually pumped phase conjugation, such as birdwing phase conjugation, utilizes two mutually incoherent laser beams directed into opposite sides of a mutually pumped phase conjugator (MPPC). The MPPC may comprise a BaTiO$_3$ photorefractive crystal, for example. The two beams interact within the MPPC to produce a mutual hologram, which can be read out by each beam to generate respective phase conjugate reflections. The spatial profile of each reflected beam is the phase conjugate of its incident beam. However, the temporal characteristics of each reflected beam correspond to the temporal characteristics of the opposite incident beam instead of those of its own incident beam.

Figure 1:
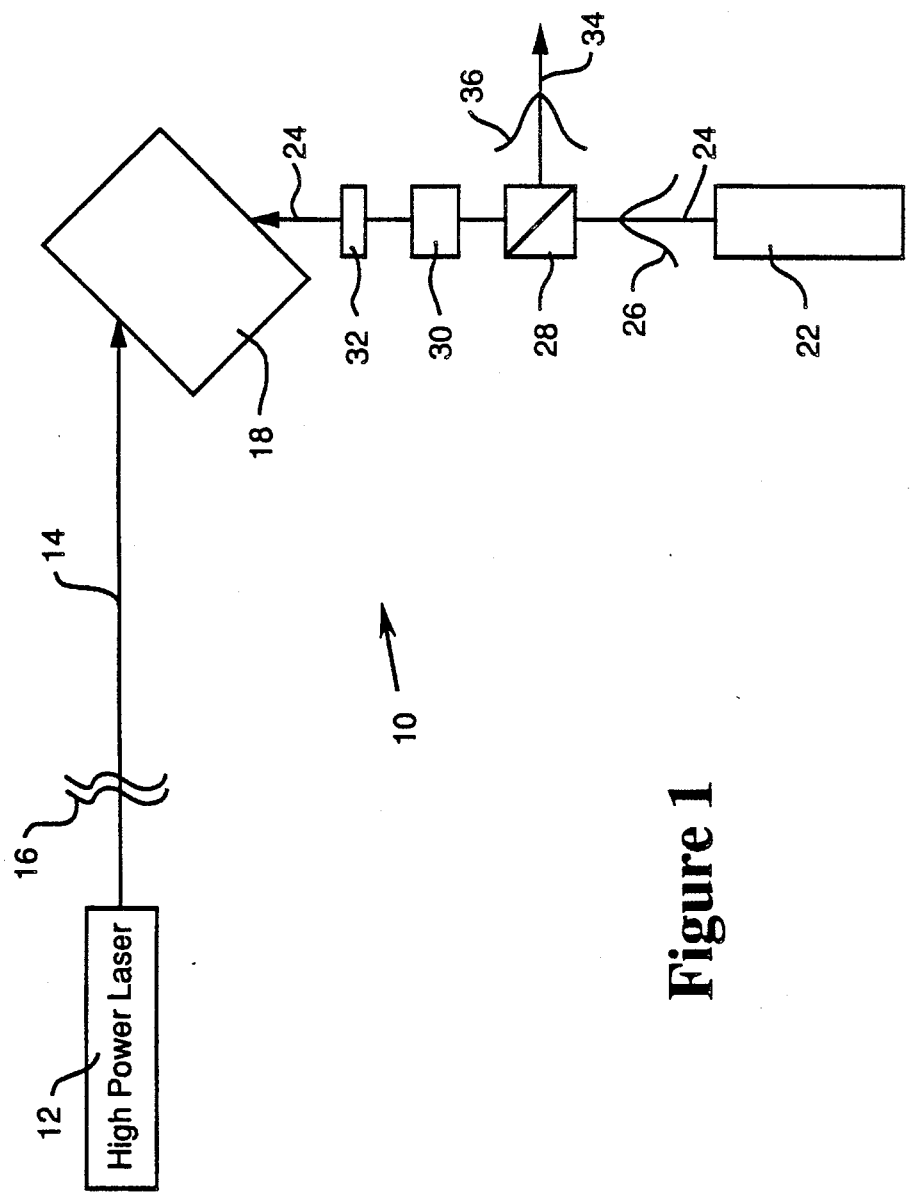
FIG. 1 is a schematic diagram of a laser beam clean-up system of the present invention using a mutually pumped phase conjugator.

A laser beam clean-up system 10 of the present invention is illustrated schematically in FIG. 1. A high power laser 12 generates a laser beam 14 that has a distorted or "dirty" spatial profile 16. Laser 12 may be a pulsed laser such as a doubled YAG laser, for example. Dirty beam 16 is directed into one side of a photorefractive crystal 18 that functions as a mutually pumped phase conjugator. A second laser 22 typically generates a weak CW beam 24 having a clean spatial profile 26, such as a diffraction limited Gaussian profile. Clean beam 24 passes through a polarizing beam splitter 28, a Faraday rotator 30, and a half-wave plate 32 before entering MPPC 18 from a side opposite that of beam 14. The optical elements 28, 30, and 32 comprise an optical isolation system that isolates laser 22 from the phase conjugate reflection of beam 24 and provides for directing or "steering" of phase conjugate output beam 34. A similar isolation system may be used, if necessary, to isolate high power laser 12 from the phase conjugate reflection of beam 14. When properly polarized, beams 14 and 24 interact to produce a mutual hologram within MPPC 18. Subsequent diffraction produces phase conjugate beams. The phase conjugate of beam 24 is reflected back through half-wave plate 32, Faraday rotator 30, and beam splitter 28, which separates phase conjugate output beam 34 from incident beam 24. Output beam 34 carries the same spatial profile 36 as the clean profile 26 of incident CW beam 24. However, in accordance with the known principles of mutual phase conjugation, output beam 34 acquires the temporal characteristics of high power beam 14. Thus, if dirty beam 14 is a pulsed beam, output beam 34 comprises the pulsed characteristics of beam 14 but the clean spatial profile of beam 24. As a result, output beam 34 is a spatially clean version of high power beam 14.

Persistence of the hologram formed in MPPC 18, an inherent feature of photorefractive crystals, facilitates mutual phase conjugation using pulsed beam 14 and CW beam 24. Each beam generates its own set of fanning holograms in the crystal independently. However, only certain components of the two sets of holograms are mutually enhanced and persist while the remaining components are erased. Thus, pulsed beam 14 is effective in generating a mutual hologram even if it is on to interact with CW beam 24 for only a small percentage of the time.

System 10 has been described as having a high power pulsed laser 12 and a weak CW laser 22, but the system works equally well or better when laser 12 is a CW laser. However, system 10 functions best when the average intensity of beam 14 and the intensity of CW beam 24 are comparable. If one beam is significantly more intense than the other, a mutual hologram may not be produced in MPPC 18. If the average intensity of pulsed beam 14 is much higher than CW beam 24, a beam splitter may be used to direct only a small fraction of beam 14 into MPPC 18, as illustrated in FIG. 2.

Figure 2:
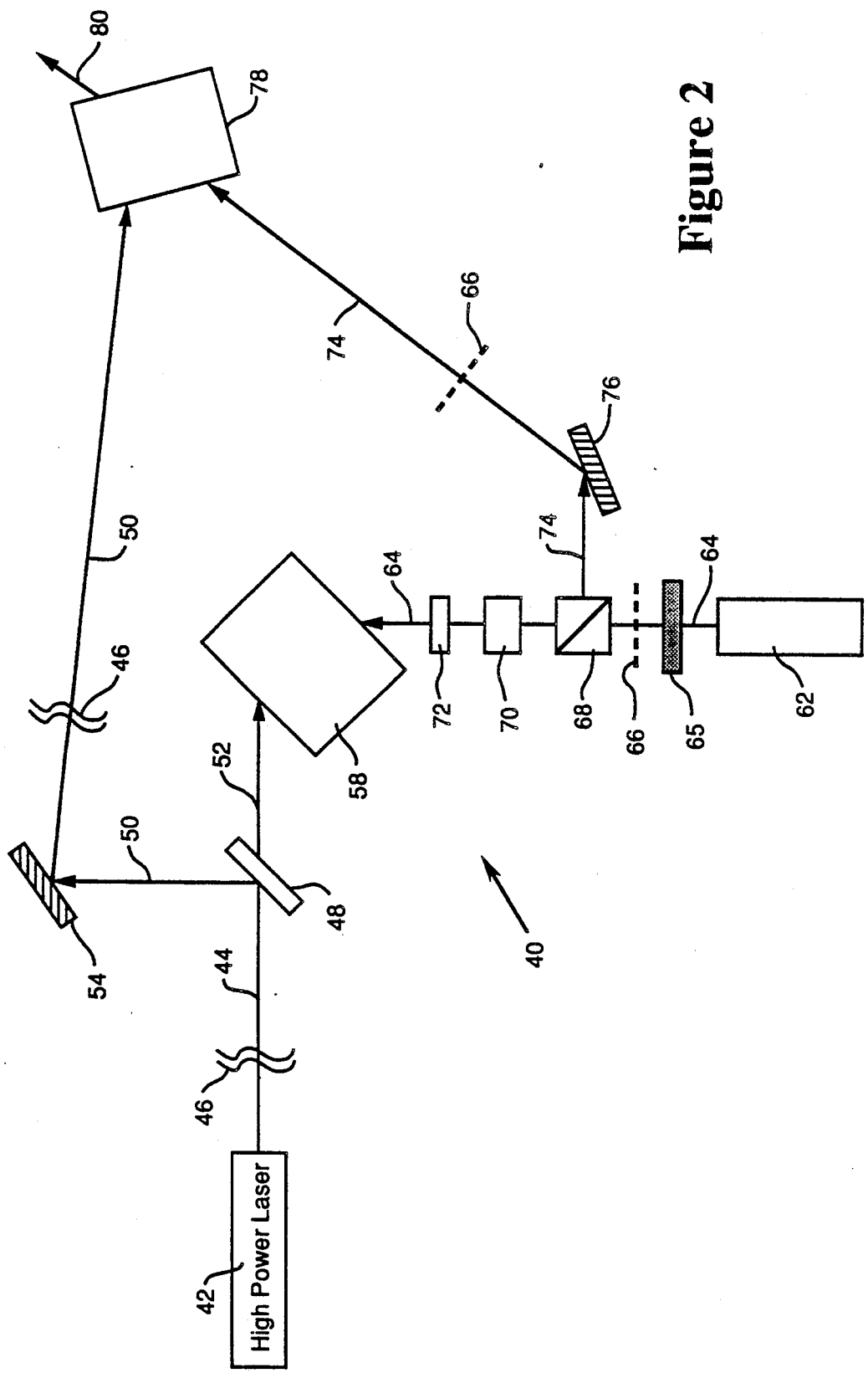
FIG. 2 is a schematic diagram of a laser beam clean-up and modification system using mutually pumped phase conjugation in conjunction with two-beam coupling for energy efficiency.

In laser beam clean-up system 40 illustrated in FIG. 2, a high power laser 42 generates a high power pulsed beam 44 having a dirty spatial profile 46. Beam 44 is split by beam splitter 48 into a reflected beam 50 comprising a large fraction of beam 44 and a transmitted beam 52 comprising a small fraction of beam 44. Beam 52 is directed into one side of an MPPC 58. A CW laser 62 generates a weak seed beam 64 that is directed through a transparency or spatial light modulator (SLM) 65 to acquire a spatially modulated image 66. Image 66, represented by the dotted line, may be a simple Gaussian profile or any other desired image profile. Beam 64 carries image 66 through polarizing beam splitter 68, Faraday rotator 70, and half-wave plate 72 and into a side of MPPC 58 opposite beam 52. The average intensity of pulsed beam 52 is comparable to the intensity of CW beam 64 so that a mutual hologram is produced efficiently in MPPC 58. A phase conjugate of beam 64 is reflected back through half-wave plate 72, Faraday rotator 70, and polarizing beam splitter 68 to produce phase conjugate beam 74. Beam 74 retains the spatial profile of image 66 but has the pulsed characteristics of beam 52 as a result of mutually pumped phase conjugation.

Pulsed beam 50, having dirty profile 46, is directed by mirror 54 into a photorefractive crystal 78. Likewise, beam 74, having image profile 66, is directed by mirror 76 into the same side of crystal 78. Because beam 74 has the same temporal characteristics as pulsed beam 50, photorefractive two-beam coupling occurs in crystal 78. As a result of two-beam coupling, most of the energy of dirty beam 50 is transferred to beam 74. Thus, beam 80 output by crystal 78 carries the spatial profile of image 66 but has the temporal characteristics and most of the energy of high power pulsed beam 44.

As described above, the laser beam clean-up system of the present invention is advantageous for high power laser beams because it does not use a spatial filter such as a pinhole. The damage threshold of a typical high power pinhole is about 1 Joule/cm$^2$. Increasing the damage threshold by increasing the diameter of the pinhole with longer focal length transform lenses is not a desirable solution because of the constraints it imposes on the beam diameter and the length of the optical system. In contrast, the damage threshold of photorefractive crystals is known to be about 10 Joules/cm$^2$. In practice, the actual increase in the damage threshold using photorefractive crystals is even greater because the beams that enter the crystals do not have to be tightly focused. In the present invention, the dirty high power laser beam interacts with a low power seed beam in a photorefractive crystal to produce a clean output beam through mutually pumped phase conjugation. The seed beam can carry any desired spatial profile. In addition, two-beam coupling can be used to increase the efficiency of the system by transferring energy from the dirty beam to the clean output beam.

Although the present invention has been described with respect to specific embodiments thereof, various changes and modifications may be suggested to one skilled in the art. Therefore, it is intended that the present invention encompass such changes and modifications as fall within the scope of the appended claims.

We claim:

1. A laser beam modification system, comprising:
    a first laser beam having first temporal characteristics and an undesired spatial profile;
    a second laser beam having second temporal characteristics and a desired spatial profile;
    nonlinear optical means for receiving said first and second laser beams and generating a phase conjugate output beam having said first temporal characteristics and said desired spatial profile; and
    means for separating said phase conjugate output beam from said second laser beam.

2. The laser beam modification system of claim 1, wherein said first laser beam comprises a high power pulsed laser beam having a distorted spatial profile.

3. The laser beam modification system of claim 2, wherein said second laser beam comprises a weak CW laser beam having a clean spatial profile.

4. The laser beam modification system of claim 3, further comprising a spatial light modulator for receiving said second laser beam and modulating said clean spatial profile to produce said desired spatial profile.

5. The laser beam modification system of claim 3, wherein said nonlinear optical means comprises a mutually pumped phase conjugator.

6. The laser beam modification system of claim 5, wherein said mutually pumped phase conjugator comprises a photorefractive crystal.

7. The laser beam modification system of claim 5, wherein said means for separating said phase conjugate output beam from said second laser beam comprises a half-wave plate, a Faraday rotator, and a polarizing beam splitter.

8. The laser beam modification system of claim 7, further comprising:

means for directing said phase conjugate output beam and a portion of said first laser beam into a two-beam coupler; and said two-beam coupler transferring power from said portion of said first laser beam to said phase conjugate output beam.

9. The laser beam modification system of claim 8, wherein said two-beam coupler comprises a photorefractive crystal.

10. A laser beam clean-up system, comprising:
a high power pulsed laser beam having a distorted spatial profile;
a low power CW laser beam having a clean spatial profile;
a mutually pumped phase conjugator for receiving said pulsed laser beam and said CW laser beam and generating a pulsed phase conjugate of said CW laser beam; and
means for separating said phase conjugate beam from said CW laser beam and providing a pulsed output beam having said clean spatial profile.

11. The laser beam clean-up system of claim 10, further comprising a spatial light modulator positioned to receive said CW laser beam before said mutually pumped phase conjugator, said spatial light modulator providing said CW laser beam with a desired spatial profile.

12. The laser beam clean-up system of claim 11, wherein said pulsed output beam has said desired spatial profile.

13. The laser beam clean-up system of claim 12, further comprising:
a photorefractive crystal;
means for directing a portion of said high power pulsed laser beam into said photorefractive crystal;
means for directing said pulsed output beam into said photorefractive crystal; and
said photorefractive crystal transferring power from said portion of said high power beam to said output beam by photorefractive two-beam coupling.

14. A method of modifying a laser beam, comprising the steps of:
providing a first laser beam having first temporal characteristics and a first spatial profile;
providing a second laser beam having second temporal characteristics and a second spatial profile;
directing said first and second laser beams into opposite sides of a mutually pumped phase conjugator;
generating a phase conjugate of said second laser beam, said phase conjugate beam having said first temporal characteristics;
separating said phase conjugate beam from said second laser beam to provide an output beam having said first temporal characteristics and said second spatial profile.

15. The method of claim 14, wherein the steps of providing laser beams comprise:
providing a first high power pulsed laser beam having a distorted spatial profile; and
providing a second low power CW laser beam having a clean spatial profile.

16. The method of claim 15, further comprising the step of modulating said clean spatial profile of said CW laser beam with a spatial light modulator to produce said second spatial profile.

17. The method of claim 16, further comprising the steps of:
directing a portion of said high power pulsed laser beam into a photorefractive crystal;
directing said output beam into said photorefractive crystal; and
transferring power from said high power beam to said output beam by photorefractive two-beam coupling.

* * * * *